United States Patent
Burbaum et al.

(10) Patent No.: US 8,847,106 B2
(45) Date of Patent: Sep. 30, 2014

(54) WELDING PROCESS WITH A CONTROLLED TEMPERATURE PROFILE AND A DEVICE THEREFOR

(75) Inventors: Bernd Burbaum, Übach-Palenberg (DE); Selim Mokadem, Düsseldorf (DE); Norbert Pirch, Aachen (DE)

(73) Assignees: Siemens Aktiengesellschaft, Munich (DE); Fraunhofer Gesellschaft zur Förderung der angewandten Forschung e.V., Munich (DE)

( * ) Notice: Subject to any disclaimer, the term of this patent is extended or adjusted under 35 U.S.C. 154(b) by 837 days.

(21) Appl. No.: 12/936,936

(22) PCT Filed: Feb. 18, 2009

(86) PCT No.: PCT/EP2009/051910
§ 371 (c)(1),
(2), (4) Date: Jan. 10, 2011

(87) PCT Pub. No.: WO2009/124802
PCT Pub. Date: Oct. 15, 2009

(65) Prior Publication Data
US 2011/0100964 A1 May 5, 2011

(30) Foreign Application Priority Data
Apr. 10, 2008 (DE) .......................... 10 2008 018 264

(51) Int. Cl.
*B23K 26/20* (2014.01)
*B23K 26/03* (2006.01)
*B23K 26/34* (2014.01)

(52) U.S. Cl.
CPC ................. *B23K 26/03* (2013.01); *B23K 26/20* (2013.01); *B23K 26/34* (2013.01); *B23K 2201/001* (2013.01)
USPC .................................. 219/121.63; 219/121.64

(58) Field of Classification Search
CPC ....................................................... B23K 26/20
USPC .......................................... 219/121.6–121.86
See application file for complete search history.

(56) References Cited

U.S. PATENT DOCUMENTS

| | | | |
|---|---|---|---|
| 4,574,176 A * | 3/1986 | Sharp ........................ | 219/121.64 |
| 6,024,792 A | 2/2000 | Bieler et al. | |
| 7,091,444 B2 * | 8/2006 | Becker et al. ............ | 219/121.64 |
| 2006/0222457 A1* | 10/2006 | Becker et al. ................ | 403/270 |
| 2008/0029495 A1* | 2/2008 | Emiljanow et al. ...... | 219/121.61 |

FOREIGN PATENT DOCUMENTS

| | | |
|---|---|---|
| DE | 4216643 A1 | 11/1993 |
| DE | 004234339 A1 * | 4/1994 |
| DE | 4234339 A1 | 4/1994 |
| DE | 4316829 A1 | 11/1994 |
| DE | 019630521 A1 * | 2/1998 |
| DE | 19750156 A1 | 5/1999 |
| DE | 19815439 A1 * | 10/1999 |
| DE | 10259177 A1 | 7/2004 |

(Continued)

*Primary Examiner* — Samuel M Heinrich

(57) ABSTRACT

A welding method in which the power is controlled in accordance with the temperature of the welding point is provided. The temperature of the welding point is lowered in a controlled manner at the end of the method and the temperature of this welding point is measured by a temperature measuring appliance.

20 Claims, 4 Drawing Sheets

(56) References Cited

FOREIGN PATENT DOCUMENTS

| | | |
|---|---|---|
| DE | 102004018699 A1 | 11/2005 |
| DE | 102004050164 A1 | 4/2006 |
| DE | 102006013960 A1 | 10/2007 |
| EP | 0309973 A1 | 4/1989 |
| EP | 0412397 A1 | 7/1990 |
| EP | 0486489 B1 | 11/1994 |
| EP | 0786017 B1 | 7/1997 |
| EP | 0892090 A1 | 1/1999 |
| EP | 0988918 A1 | 3/2000 |
| EP | 1201610 A2 | 5/2002 |
| EP | 1204776 B1 | 5/2002 |
| EP | 1306454 A1 | 5/2003 |
| EP | 1319729 A1 | 6/2003 |
| EP | 1629934 A2 | 3/2006 |
| JP | 2000218383 A * | 8/2000 |
| JP | 3126791 B2 * | 1/2001 |
| WO | WO 9967435 A1 | 12/1999 |
| WO | WO 0044949 A1 | 8/2000 |
| WO | WO 2004020139 A1 | 3/2004 |
| WO | WO2004056524 A1 * | 7/2004 |
| WO | WO 2005099958 A1 | 10/2005 |

* cited by examiner

FIG 6

Chemical composition in %

| Material | C | Cr | Ni | Co | Mo | W | Ta | Nb | Al | Ti | B | Zr | Hf |
|---|---|---|---|---|---|---|---|---|---|---|---|---|---|
| Ni-based investment casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | 1.00 |
| IN 792 DS | 0.08 | 12.5 | Rem. | 9.0 | 1.9 | 4.1 | 4.1 | | 3.4 | 3.8 | 0.015 | 0.02 | |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <.006 | 8.0 | Rem. | 4.6 | 0.6 | 8.0 | 6.0 | | 5.6 | 1.0 | <.003 | <.0075 | |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | 0.10 |
| CMSX-6 | <.015 | 10.0 | Rem. | 5.0 | 3.0 | <.10 | 2.0 | <.10 | 4.9 | 4.8 | <.003 | <.0075 | 0.10 |
| PWA 1480 SX | <.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-based investment casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.55 | 24.0 | 10 | 51.7 | | 7.5 | 4.0 | | 0.25 | 0.3 | 0.010 | 0.05 | |
| MAR-M-509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

WELDING PROCESS WITH A CONTROLLED TEMPERATURE PROFILE AND A DEVICE THEREFOR

CROSS REFERENCE TO RELATED APPLICATIONS

This application is the US National Stage of International Application No. PCT/EP2009/051910, filed Feb. 18, 2009 and claims the benefit thereof. The International Application claims the benefits of German application No. 10 2008 018 264.8 DE filed Apr. 10, 2008. All of the applications are incorporated by reference herein in their entirety.

FIELD OF INVENTION

The invention relates to a process for welding a component and to a device therefor.

BACKGROUND OF INVENTION

Welding processes are often used to join components to one another, to remelt cracks or to apply material.

Components of gas turbines, e.g. turbine blades or vanes, are therefore also repaired by means of welding processes, in particular laser processes, where the components may even have a directionally solidified structure (DS, SX). In this case, material of the substrate or material of the substrate and added weld metal is melted. However, cracks always appear in the weld seam.

SUMMARY OF INVENTION

It is therefore an object of the invention to overcome the problem mentioned above.

The object is achieved by a process as claimed in the claims, in which the power is controlled in accordance with the temperature, and by a device as claimed in the claims.

The dependent claims list further advantageous measures which can be combined with one another, as desired, in order to obtain further advantages.

BRIEF DESCRIPTION OF THE DRAWINGS

FIG. 6 shows a list of superalloys.

The figures and the description represent only exemplary embodiments of the invention.

DETAILED DESCRIPTION OF INVENTION

Figure 1:
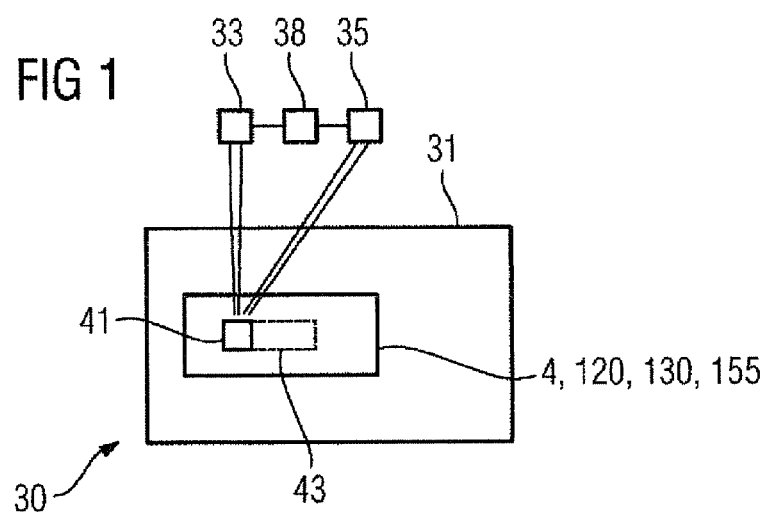
FIG. 1 shows a device according to the invention.
Figure 3:
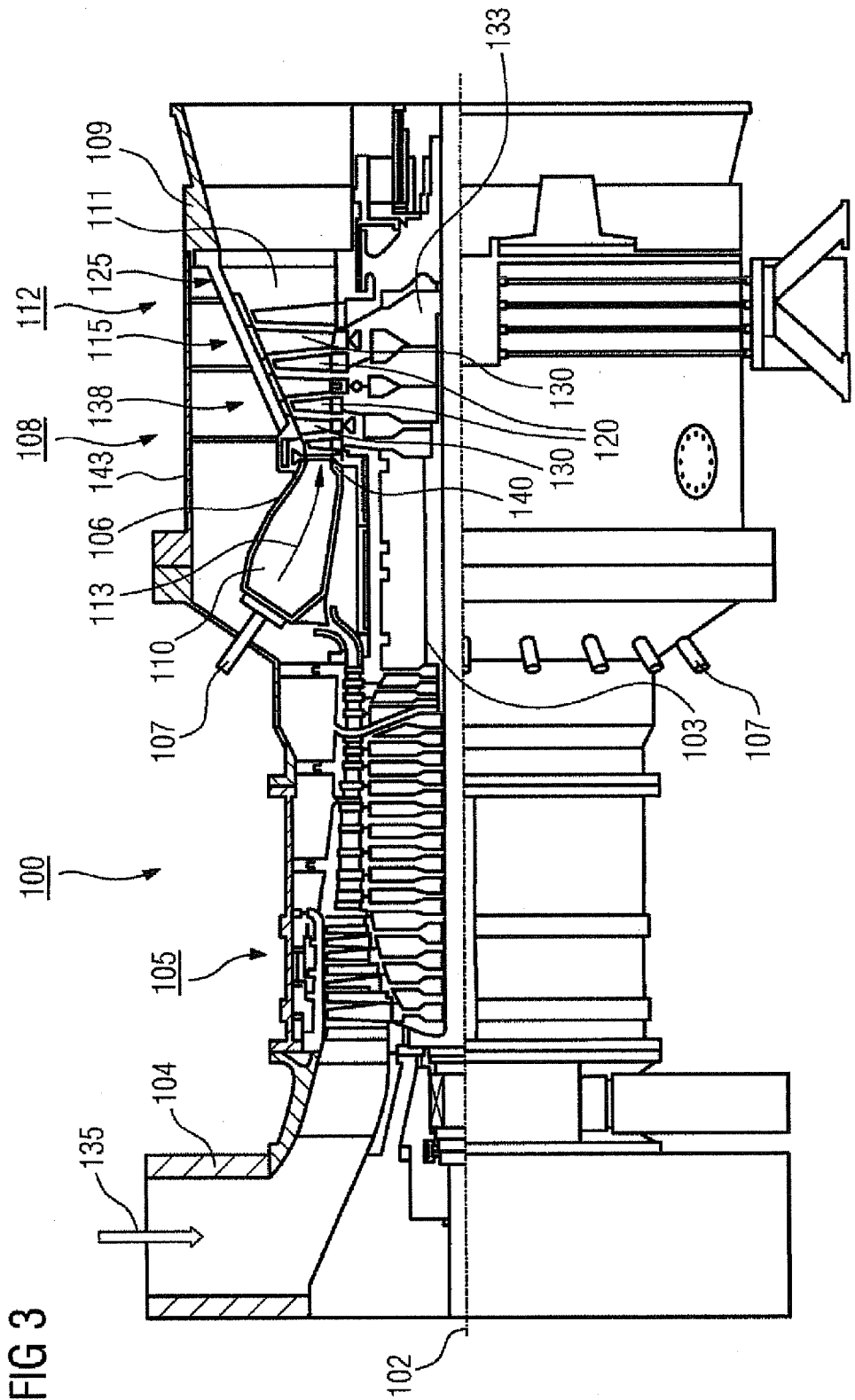
FIG. 3 shows a gas turbine.

FIG. 1 shows a component 4 which represents, in particular, a component 120, 130, 155 (FIGS. 4, 5) of a gas turbine 100 (FIG. 3).

The component 4, 120, 130, 155 preferably has a superalloy according to FIG. 6.

The component 4, 120, 130, 155 is arranged in a receptacle 31 of a device 30, the device 30 having a welding appliance 33 and a temperature measuring appliance 35. The device 30 preferably has a laser 33 or an electron beam gun, which irradiates the component 4, 120, 130, 155 locally in a region 41 in order to weld it.

The component 4 and/or the welding appliance 33 are moved with respect to one another in order to produce a weld seam 43. The welding appliance 33 irradiates the region 41 of the component 4, 120, 130, 155, where it produces a molten pool. The irradiated region 41 is moved over the component 4, 120, 130, 155 such that a molten pool, which provides a weld seam 43 (indicated as dashed lines) at the end of the process, is repeatedly produced or displaced along this direction of movement.

The temperature T of the region 41 to be welded, i.e. of the irradiated region 41, is measured by a temperature measuring appliance 35 and is forwarded to the welding appliance 33 by appropriate means 38, such as electronic connections, a computer or a controller.

Figure 2:
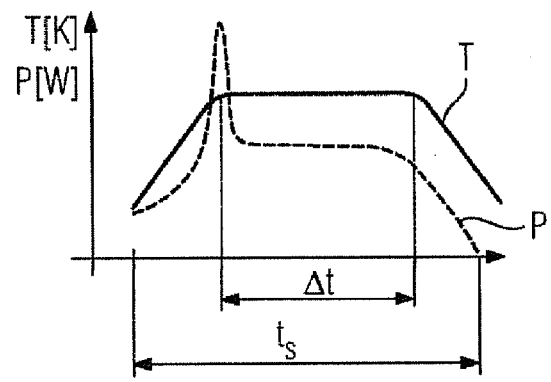
FIG. 2 shows a profile of the temperature and of the power.

FIG. 2 shows the temperature profile during a welding process.

The graph plots the temperature T[K] of the irradiated region 41 and the power P[W] of the welding appliance 33.

The temperature T of the region 41 to be welded is initially increased from zero by increasing the power P of the welding appliance 33. In this case, the component or the welding appliance are preferably even moved with respect to one another directly as the power P is being increased. The temperature T is preferably increased in a controlled manner at the start of the process, in particular increased constantly.

Once a constant temperature, in particular a maximum temperature $T_{max}$, has preferably been reached, the power P of the welding appliance 33 preferably continues to be controlled in such a manner that a constant temperature is preferably set during the movement time $\Delta t$. The weld seam 43 is produced during the movement time $\Delta t$.

At the end of the process, when the weld seam 43 is applied or the material of the component 4 has been remelted, the temperature T is decreased, in particular by limiting the power P. In particular, the temperature T is lowered in a controlled manner, in particular lowered constantly, in order to avoid cracks.

In this case, the laser power P is preferably reduced to 0 watt. As the power P is being reduced, the component and the laser preferably continue to be moved with respect to one another, preferably until P=0 W.

In FIG. 2, the temperature T of the irradiated pool 41 of the component 4 is shown by a continuous line and the laser power P controlled for that purpose is shown by a dashed line.

The temperature T is increased to a defined temperature, in particular $T_{max}$, kept constant and decreased again after a defined time $\Delta t$. The temperature $T_{max}$ is retained for the defined time period $\Delta t$, while the component 4 and/or the welding appliance 33 are moved. The laser power P is controlled in such a manner that a constant temperature T is obtained during the time period $\Delta t$, and so the power P of the laser 33 rises greatly at the start, falls again and preferably also continues to fall during the time $\Delta t$. Whereas the temperature T is constant, the power P changes, preferably falling slightly, in particular at least up to halfway through the movement time $\Delta t$.

At the start of the process, the power P of the welding appliance 33 is preferably at its highest during the controlled temperature profile T(t), such that thermal stresses within the weld seam 43 or the solidifying weld metal and the cold and solid substrate of the component 4 are reduced, and therefore the component 4, 120, 130, 155 and the weld seam 43 no longer have any cracks after the welding.

The power of the laser 33 is controlled by means of a temperature measuring appliance 35, in particular a pyrometer.

In particular, this is a welding process which is carried out without weld fillers, but can also be carried out with weld fillers.

The device 30 can have a process chamber (not shown), such that a vacuum or an inert gas atmosphere can be established in the process chamber.

FIG. 3 shows, by way of example, a partial longitudinal section through a gas turbine 100.

In the interior, the gas turbine 100 has a rotor 103 with a shaft which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is fowled, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure).

By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloys.

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

Figure 4:
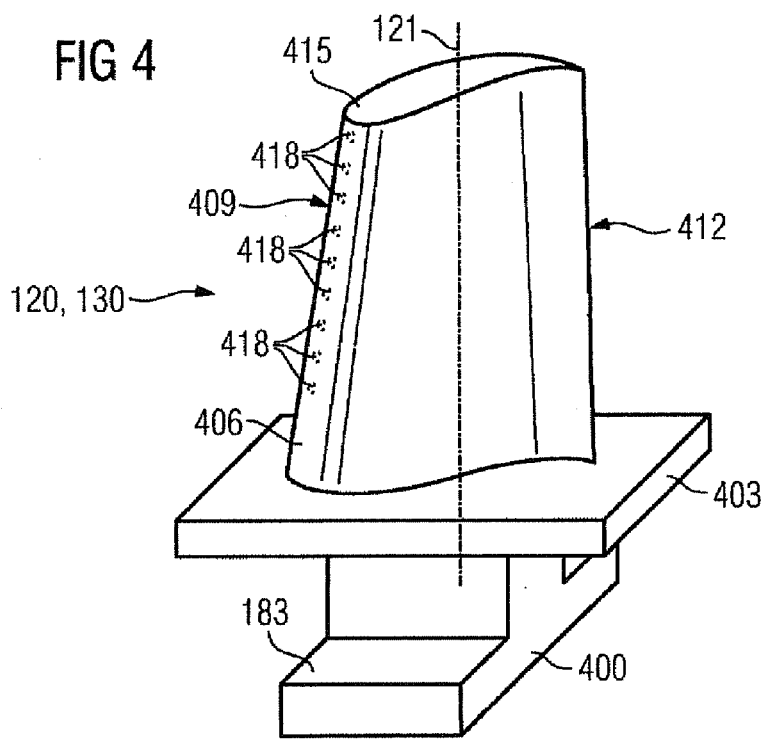
FIG. 4 shows a perspective view of a turbine blade or vane.

FIG. 4 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure with regard to the chemical composition of the alloy.

The blade or vane 120, 130 may in this case be produced by a casting process, by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1; these documents form part of the disclosure with regard to the solidification process.

The blades or vanes 120, 130 may likewise have coatings protecting against corrosion or oxidation e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to foam part of this disclosure with regard to the chemical composition of the alloy.

The density is preferably 95% of the theoretical density.

A protective aluminum oxide layer (TGO=thermally grown oxide layer) is fainted on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

The blade or vane 120, 130 may be hollow or solid in faun. If the blade or vane 120, 130 is to be cooled, it is hollow and may also have film-cooling holes 418 (indicated by dashed lines).

Figure 5:
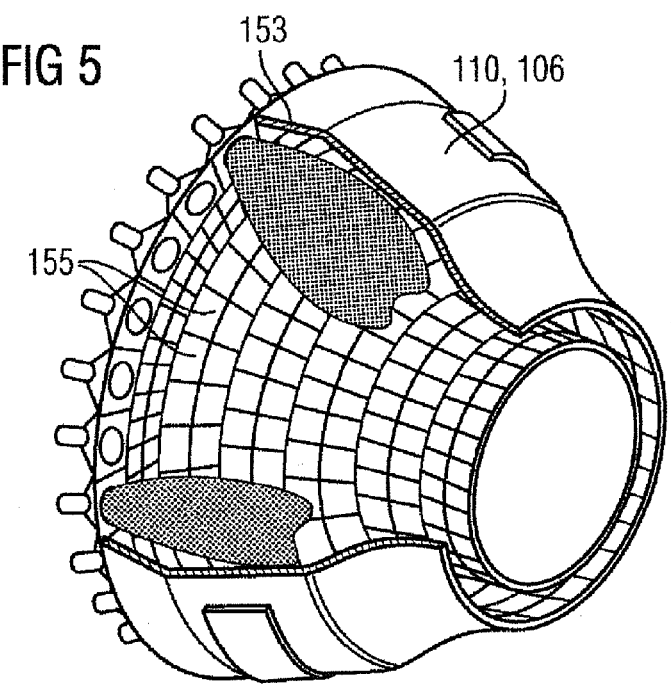
FIG. 5 shows a perspective view of a combustion chamber.

FIG. 5 shows a combustion chamber 110 of the gas turbine 100. The combustion chamber 110 is configured, for example, as what is known as an annular combustion chamber, in which a multiplicity of burners 107, which generate flames 156, arranged circumferentially around an axis of rotation 102 open out into a common combustion chamber space 154. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

Moreover, a cooling system may be provided for the heat shield elements 155 and/or their holding elements, on account of the high temperatures in the interior of the combustion chamber 110. The heat shield elements 155 are then, for example, hollow and may also have cooling holes (not shown) opening out into the combustion chamber space 154.

On the working medium side, each heat shield element 155 made from an alloy is equipped with a particularly heat-resistant protective layer (MCrAlX layer and/or ceramic coating) or is made from material that is able to withstand high temperatures (solid ceramic bricks).

These protective layers may be similar to the turbine blades or vanes, i.e. for example MCrAlX: M is at least one element selected from the group consisting of iron (Fe), cobalt (Co), nickel (Ni), X is an active element and stands for yttrium (Y) and/or silicon and/or at least one rare earth element or hafnium (Hf). Alloys of this type are known from EP 0 486 489 B1, EP 0 786 017 B1, EP 0 412 397 B1 or EP 1 306 454 A1, which are intended to form part of this disclosure with regard to the chemical composition of the alloy.

It is also possible for a, for example, ceramic thermal barrier coating to be present on the MCrAlX, consisting for example of $ZrO_2$, $Y_2O_3$—$ZrO_2$, i.e. unstabilized, partially stabilized or fully stabilized by yttrium oxide and/or calcium oxide and/or magnesium oxide.

Columnar grains are produced in the thermal barrier coating by suitable coating processes, such as for example electron beam physical vapor deposition (EB-PVD).

Other coating processes are possible, e.g. atmospheric plasma spraying (APS), LPPS, VPS or CVD. The thermal barrier coating may include grains that are porous or have micro-cracks or macro-cracks, in order to improve the resistance to thermal shocks.

Refurbishment means that after they have been used, protective layers may have to be removed from turbine blades or vanes 120, 130 or heat shield elements 155 (e.g. by sandblasting). Then, the corrosion and/or oxidation layers and products are removed. If appropriate, cracks in the turbine blade or vane 120, 130 or in the heat shield element 155 are also repaired. This is followed by recoating of the turbine blades or vanes 120, 130 or heat shield elements 155, after which the turbine blades or vanes 120, 130 or the heat shield elements 155 can be reused.

The invention claimed is:

1. A process for welding a component using a welding appliance, comprising:
   irradiating a region of the component;
   controlling the power of the welding appliance in accordance with a temperature of the irradiated region of the component; and
   lowering the temperature of the irradiated region in a controlled manner by limiting the power of the welding appliance at the end of the welding process.

2. The process as claimed in claim 1, wherein the temperature is lowered constantly.

3. The process as claimed in claim 1, wherein the temperature of the irradiated region is increased in a controlled manner at the start of the welding.

4. The process as claimed in claim 3, wherein the temperature is increased constantly.

5. The process as claimed in claim 1,
   wherein the welding appliance and the component are moved with respect to one another, and
   wherein after an initial phase, a power of the welding appliance is controlled in order to maintain a constant temperature of the irradiated region during the process.

6. The process as claimed in claim 5, wherein the constant temperature is a maximum temperature of the irradiated region.

7. The process as claimed in claim 5, wherein the constant temperature is retained for a movement time.

8. The process as claimed in claim 1, wherein the power of the welding appliance is reduced to zero at the end of the welding process.

9. The process as claimed in claim 1, wherein a laser welding appliance is used.

10. The process as claimed in claim 1,
wherein a temperature measuring appliance is used to measure the temperature of the region to be irradiated,
wherein the temperature is used to control the power of the welding appliance.

11. The process as claimed in claim 1, wherein which the irradiated region is a molten region.

12. The process as claimed in claim 1, wherein the power of the welding appliance is at a highest power at the start of the process.

13. The process as claimed in claim 7, wherein the power of the welding appliance decreases continuously at least up to halfway through the movement time.

14. The process as claimed in claim 13, wherein the component or the welding appliance moves with respect to one another directly as the power is being increased.

15. The process as claimed in claim 13, wherein the component or the welding appliance move with respect to one another as the power is being decreased.

16. The process as claimed in claim 1, wherein the component is a component of a gas turbine comprising a superalloy.

17. A device, comprising:
a welding appliance with power control;
a receptacle for a component to be welded;
a temperature measuring appliance; and
a controller,
wherein the controller uses a temperature of a region irradiated by the welding appliance as an influencing variable for controlling a power of the welding appliance according to the process of claim 1.

18. The device as claimed in claim 17, wherein the welding appliance is a laser welding appliance.

19. The device as claimed in claim 17, further comprising a means which can process information of the temperature measuring appliance and forward the information to the welding appliance.

20. The device as claimed in claim 17, further comprising the component,
wherein the component is a component of a gas turbine comprising a superalloy.

* * * * *